United States Patent [19]

Persson

[11] Patent Number: 5,442,956
[45] Date of Patent: Aug. 22, 1995

[54] TORQUE SENSOR FOR A POWER ASSIST STEERING SYSTEM

[75] Inventor: Erland Persson, Golden Valley, Minn.

[73] Assignee: TRW Inc., Lyndhurst, Ohio

[21] Appl. No.: 34,746

[22] Filed: Mar. 19, 1993

Related U.S. Application Data

[63] Continuation-in-part of Ser. No. 893,090, Jun. 3, 1992, Pat. No. 5,406,155.

[51] Int. Cl.$^6$ ............................................. G01B 7/14
[52] U.S. Cl. ................................................ 73/118.1
[58] Field of Search ................ 73/118.1, 131, 862.191, 73/862.08

[56] References Cited

U.S. PATENT DOCUMENTS

| | | | |
|---|---|---|---|
| 2,545,650 | 4/1951 | Chudyk | 73/118.1 |
| 3,201,981 | 8/1965 | Barnard | 73/862.08 |
| 4,660,671 | 4/1987 | Behr et al. | 180/142 |
| 4,682,104 | 7/1987 | Lombard et al. | 324/207.17 |
| 4,838,074 | 6/1989 | Morishita et al. | 73/118.1 |
| 4,887,461 | 12/1989 | Sugimoto et al. | 73/118.1 |
| 4,994,799 | 2/1991 | Levigion | 340/870.3 |
| 5,257,828 | 11/1993 | Miller et al. | 180/79.1 |

FOREIGN PATENT DOCUMENTS

| | | | |
|---|---|---|---|
| 0523025 | 1/1993 | European Pat. Off. | 73/862.08 |
| 64-35329 | 2/1989 | Japan | 73/862.08 |

Primary Examiner—Richard E. Chilcot, Jr.
Assistant Examiner—James M. Olsen
Attorney, Agent, or Firm—Tarolli, Sundheim & Covell

[57] ABSTRACT

A torque sensor is presented for use in a power assist steering system for sensing the applied steering torque between an input shaft and an output shaft and wherein the shafts are coaxially aligned and rotatable relative to each other about a common axis. The sensor includes a rotary input transformer having a stationary primary winding and a rotary secondary winding. A rotary transmitter is driven by the input shaft for rotation therewith about the common axis. The transmitter carries a coil set including a plurality of series connected coils arranged in an annular array about the axis on an axially directed face of the transmitter. All of the coils are wound in the same direction and are electrically connected to the secondary winding for receiving an input signal therefrom. A rotary receiver is axially spaced from the transmitter and is driven by the output shaft for rotation therewith about the common axis. The receiver has an axially directed face extending toward the transmitter face and carries first and second coil sets. Each coil set includes a plurality of series connected coils with each coil being wound in the same direction. First and second rotary output transformers are provided having first and second primary windings respectively electrically connected to the first and second receiver coil sets and driven by the output shaft for rotation about the common axis. The output transformers include first and second stationary windings.

9 Claims, 5 Drawing Sheets

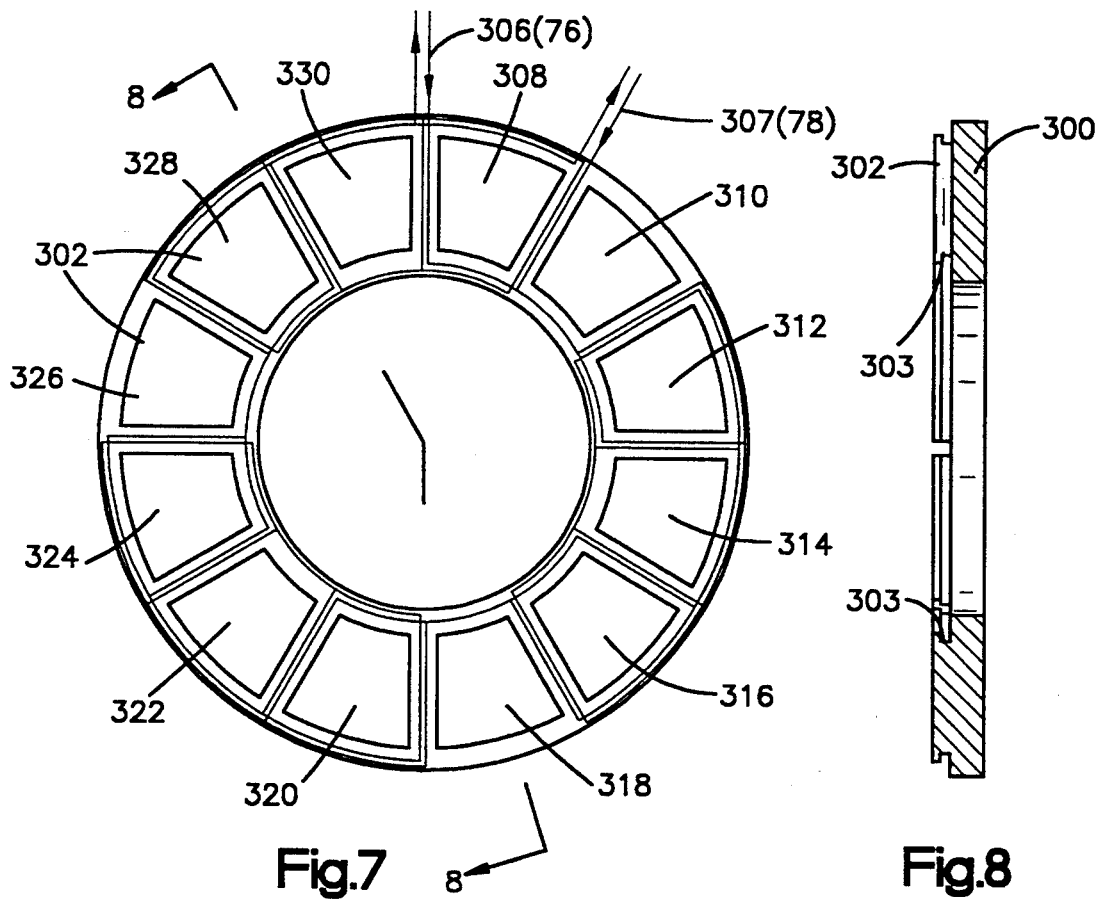
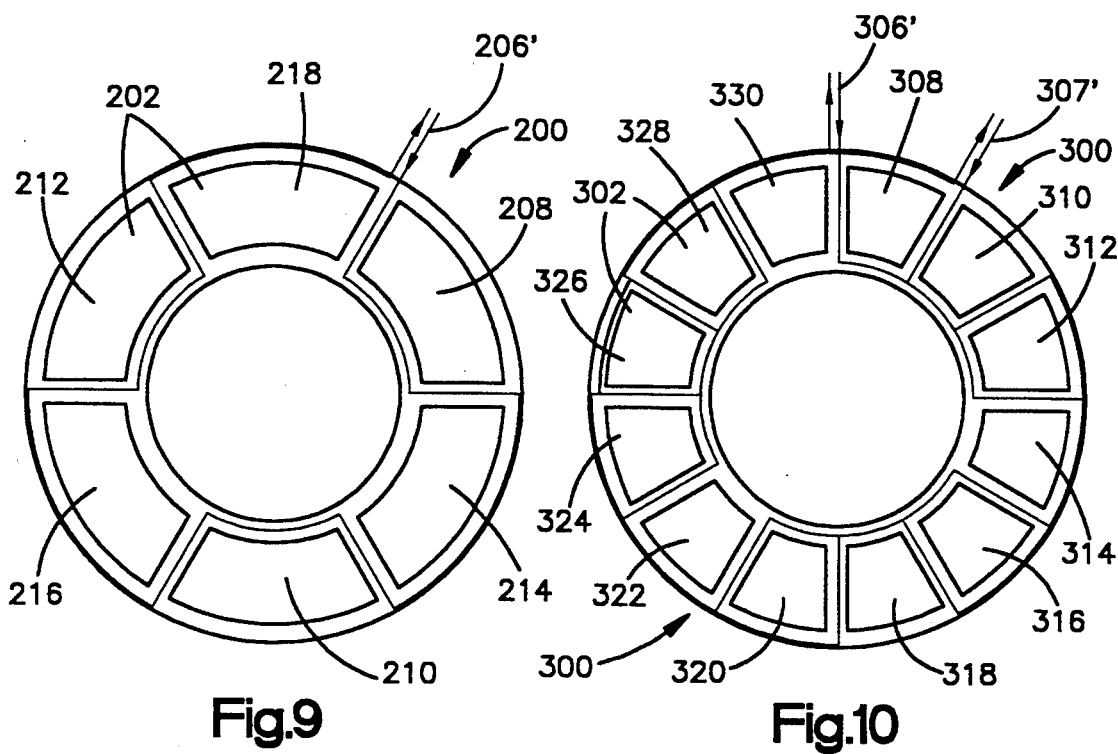

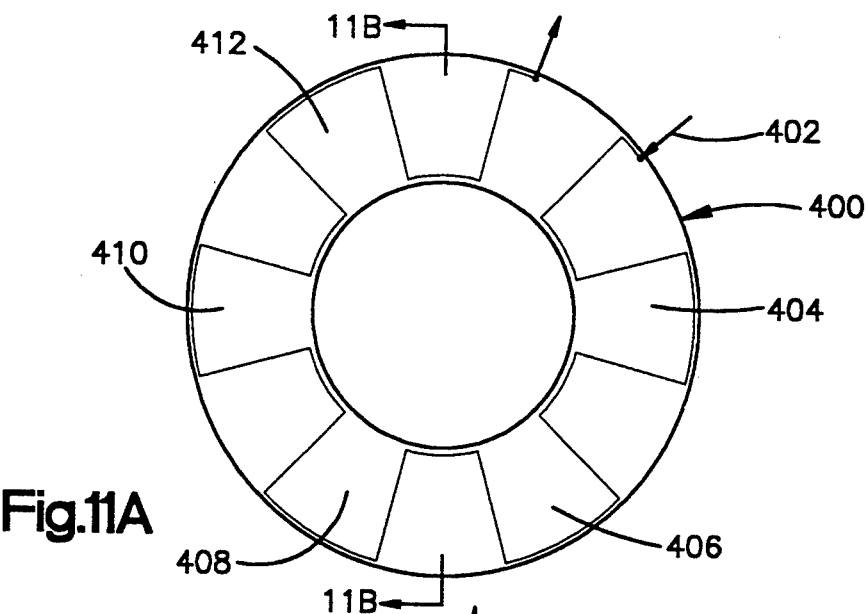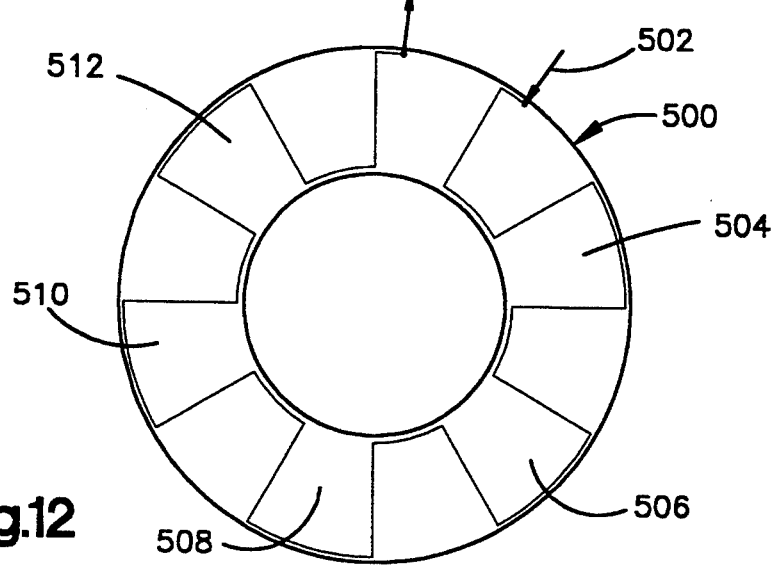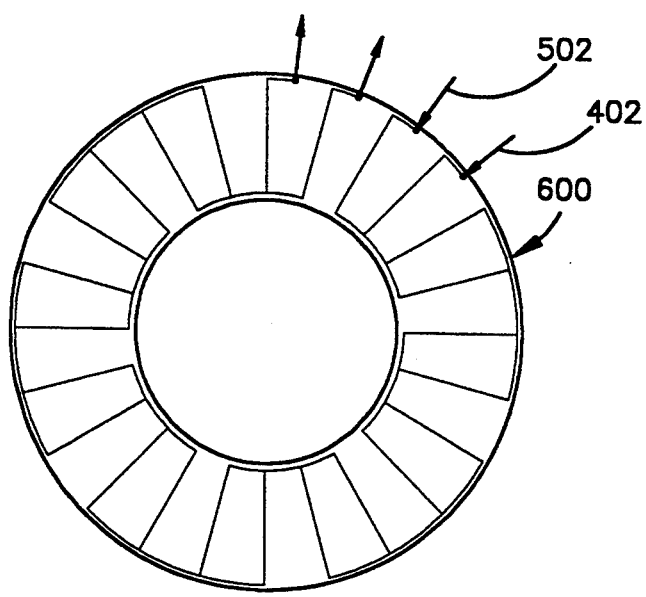
Fig.11A
Fig.11B
Fig.12
Fig.13

TORQUE SENSOR FOR A POWER ASSIST STEERING SYSTEM

RELATED APPLICATION

This is a continuation-in-part application of my co-pending U.S. application Ser. No. 893,090, filed Jun. 3, 1992, now U.S. Pat. No. 5,406,155, and which is assigned to the same assignee as that of the present invention.

TECHNICAL FIELD

The present invention is directed to the art of torque sensors and, more particularly, to torque sensors having particular application for use in power assist steering systems.

BACKGROUND OF THE INVENTION

Power assist steering systems are well known in the art. They are frequently employed for use with automotive vehicles. The power assist is accomplished by applying a supplementary rotary force to a steering member. Such systems may be controlled in response to a driver's applied torque to the vehicle's steering wheels. Some of the systems provide steering assist by using hydraulic power and others by using electric power.

U.S. Pat. No. 4,660,671 discloses a DC electric assist motor. The motor includes a rotatable armature encircling a steering member which has a thread convolution portion thereon and a portion having a rack thereon. Rotation of the electric assist motor armature causes linear movement of the steering wheel through a ball-nut drive arrangement in combination with the thread convolution portion of the steering member. A torque sensing means is coupled to the steering column to sense driver applied input torque to the steering wheel. The torque sensing device uses a magnetic Hall-effect sensor arrangement for sensing relative rotation between the input and output shafts across a torsion bar. An electric control circuit monitors the signal from the torque sensing means and controls the electric assist motor in response thereto.

U.S. Pat. No. 4,682,104 discloses an angular displacement sensor for use in detecting applied steering torque between an input shaft and an output shaft wherein the shafts are coaxially aligned with each other and rotatable relative to each other about a common axis. The sensor includes an input rotary transformer which includes a stationary primary winding and a rotary secondary winding. The secondary winding is mounted on one face of an annular disc which is, in turn, mounted on the input shaft for rotation therewith. Axially displaced from the input rotary transformer there is provided a pair of detection disks including a transmitter disk and a receiver disk. The opposing faces of these disks carry identical planar coils with the coils being in the shape of spirally wound sectors coiled alternately in opposing directions and coaxially surrounding the common axis of the input and output shafts. An AC voltage applied to the primary of the input rotary transformer is applied to the planar coils on the transmitter disk. This causes a voltage to be induced in the planar coils mounted on the receiver disk. A single output planar rotary transformer is employed having a primary winding mounted on a disk and coaxially surrounding the output shaft. The output transformer also includes a single stationary secondary winding on another disk axially spaced from the primary winding of the output transformer. A single output signal is provided which varies with angular deviation between the input and output shafts.

SUMMARY OF THE INVENTION

The present invention provides an improved torque sensor for use in power steering systems and which does not employ a transmitter or receiver disk carrying coils wound alternately in opposing directions as noted in such prior art as the U.S. Pat. No. 4,682,104.

The present invention contemplates that a torque sensor be employed for use in a power assist steering system for sensing the applied steering torque between an input shaft and an output shaft wherein the shafts are coaxially aligned and rotatable relative to each other about a common axis.

The torque sensor includes a rotary input transformer having a stationary winding and a rotary secondary winding. A rotary transmitter is adapted to be driven by the input shaft for rotation therewith. A coil set including a plurality of series connected coils is provided. These coils are arranged in an annular array about the common axis of rotation on an axially directed face of the transmitter. All of the coils are wound in the same direction. The series connected coils are electrically connected to the secondary winding on the rotary input transformer for receiving an input signal therefrom. A rotary receiver is axially spaced from the transmitter and is adapted to be driven by the output shaft for rotation therewith about the common axis. The receiver has an axially directed face extending toward the transmitter face. First and second coil sets, each including a plurality of series connected coils, are mounted on the receiver face. These coils are wound in the same direction. Each of the receiver coil sets are arranged in an annular array about the common axis. First and second rotary output transformers are also provided with each having a primary winding carried by the output shaft for rotation therewith about the common axis. The output transformers respectively include first and second stationary secondary windings associated with first and second rotary primary windings for providing a pair of output signals.

BRIEF DESCRIPTION OF THE DRAWINGS

The foregoing and other objects and advantages of the invention will become more readily apparent from the following description as taken in conjunction with the accompanying drawings, wherein:

FIG. 7 is a view of the front face of a receiver disk having a plurality of segmented poles carrying first and second sets of series connected coils each arranged in an annular array;

FIG. 8 is a view taken along line 8—8 looking in the direction of the arrows of FIG. 7;

FIG. 9 is a view similar to that of FIG. 5 but showing a second embodiment of the transmitter disk having segmented poles and having a coil set of series connected coils arranged in an annular array;

FIG. 10 is a view similar to that of FIG. 7 but of a second embodiment of the receiver disk showing segmented poles having first and second sets of series connected coils thereon each arranged in an annular array;

FIG. 11A is a view of the front face of a third embodiment of a transmitter disk carrying an annular planar array of coils;

FIG. 11B is a view taken along line 11B—11B looking in the direction of the arrows in FIG. 11A;

FIG. 12 is a view of the front face of another disk carrying another annular planar array of coils displaced angularly about the common axis from that of the coils in FIG. 11; and FIG. 13 is a view of the front face of a receiver disk employing the coils of FIGS. 11 and 12 superimposed on each other.

DESCRIPTION OF PREFERRED EMBODIMENTS

Figure 1:
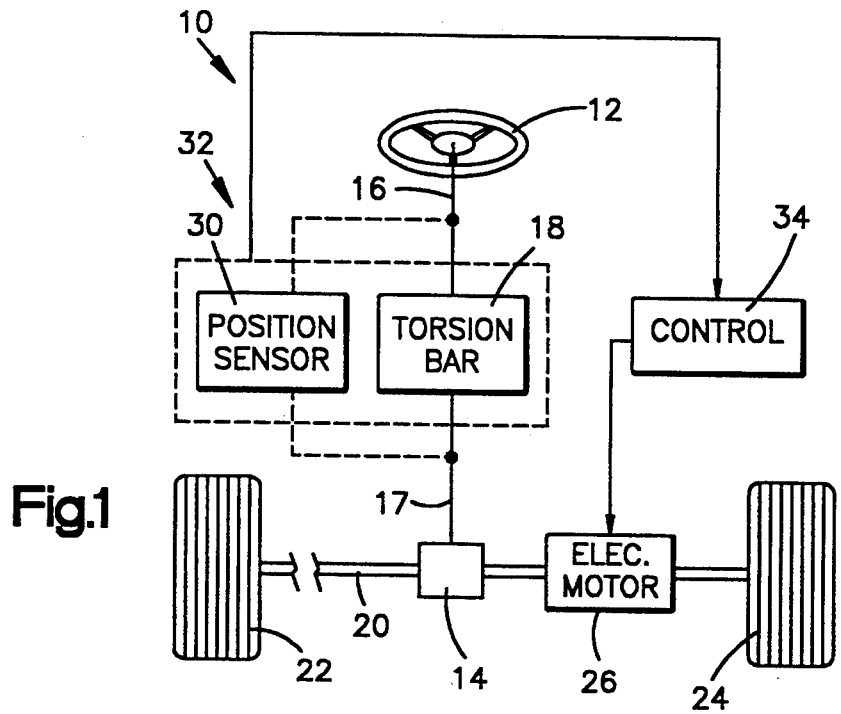
FIG. 1 is a schematic-block diagram illustrating a power assist system which may be employed with the present invention.

Reference is now made to the drawings wherein the showings are for purposes of illustrating preferred embodiments and not for purposes of limiting same. FIG. 1 illustrates a power assist steering system 10 including a steering wheel 12 operatively connected to a pinion gear 14. The steering wheel 12 is connected to an input shaft 16 and the pinion gear 14 is connected to an output shaft 17. The input shaft 16 is operatively connected to the output shaft 17 through a torsion bar 18. The torsion bar 18 twists in response to applied steering torque thereby permitting relative rotation between the input shaft 16 and the output shaft 17 about a common axis.

The pinion gear 14 has helical teeth which meshingly engage with teeth along a rack or linear steering member 20. The pinion gear in combination with the gear teeth on the rack member 20 form a rack and pinion gear set. The rack member 20 is coupled to the vehicle's steerable wheels 22, 24 with steering linkage in a known manner. When the steering wheel 12 is turned, the rack and pinion gear set converts the rotary motion of the steering wheel into a linear motion of the rack member. When the rack member moves linearly, the steerable wheels 22, 24 pivot about their associated steering axes and the vehicle is steered.

An electric assist motor 26 is drivingly connected to the rack member 20. When the electric motor 26 is energized, it provides power assist steering so as to aid in the rotation of the vehicle steering wheel by the vehicle operator. A position sensor 30 is operatively connected across the input shaft 16 and the output shaft 17 and provides an electrical signal having a value representative of the relative rotational position between the input shaft and the output shaft. The position sensor 30 in combination with the torsion bar 18 form a torque sensor 32. The output of the sensor is indicative of the applied steering torque to the vehicle steering wheel by the vehicle operator. The output from the sensor 32 is supplied to a control circuit 34 which processes the torque signal and separates it into a directional signal and a magnitude signal and utilizes these signals for controlling the electric motor 26.

Figure 2:
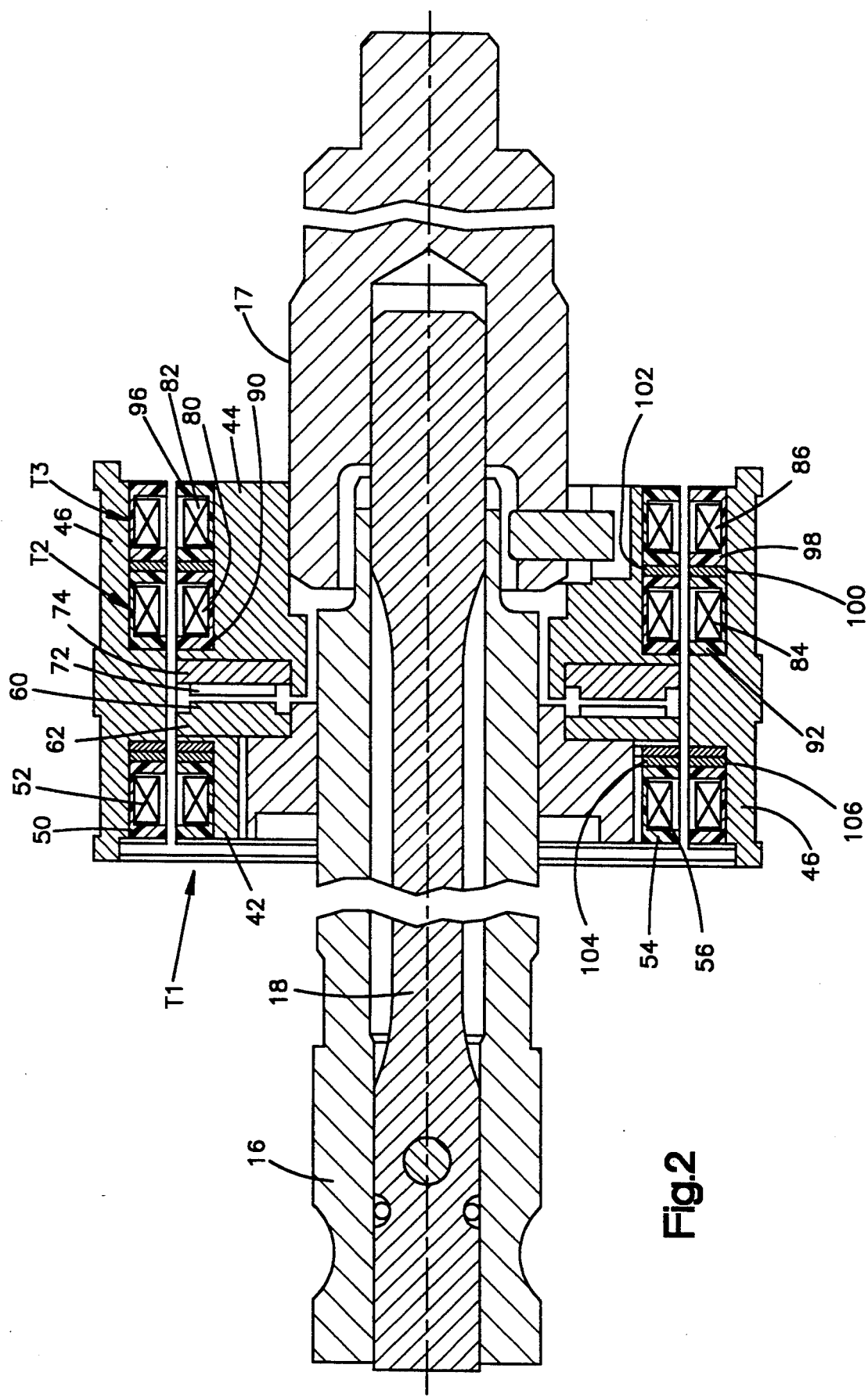
FIG. 2 is a sectional view illustrating one embodiment of the invention.

Reference is now made to FIG. 2 which illustrates the torque sensor 32 in greater detail. The torque sensor 32 includes a torsion bar 18 which interconnects the steering wheel input shaft 16 with a pinion gear output shaft 17 in a known manner, such as described in U.S. Pat. No. 4,660,671 discussed hereinbefore.

Referring now to FIG. 2, an annular input rotor 42 coaxially surrounds and is suitably mounted to the input shaft 16 for rotation therewith. Axially spaced from input rotor 42 there is provided an annular output rotor 44 which coaxially surrounds and is suitably mounted to the output shaft 17 for rotation therewith about the common axis of rotation of the shafts 16 and 17. The input rotor 42 and the output rotor 44 are angularly movable relative to each other about the common axis of rotation. Torsion applied to the torsion rod 18 will result in relative angular rotation of input rotor 42 with respect to output rotor 44, and it is the extent of this rotation that is to be measured by the torque sensor described herein.

The rotors 42 and 44 are coaxially surrounded by a stationary stator 46. The rotors 42 and 44 and the stator 46 may be constructed of metal, such as aluminum, or plastic. In any event, the rotors 42 and 44 and the stator 46 are not part of the magnetic circuit employed for sensing relative angular rotation between the rotors.

Figure 3:
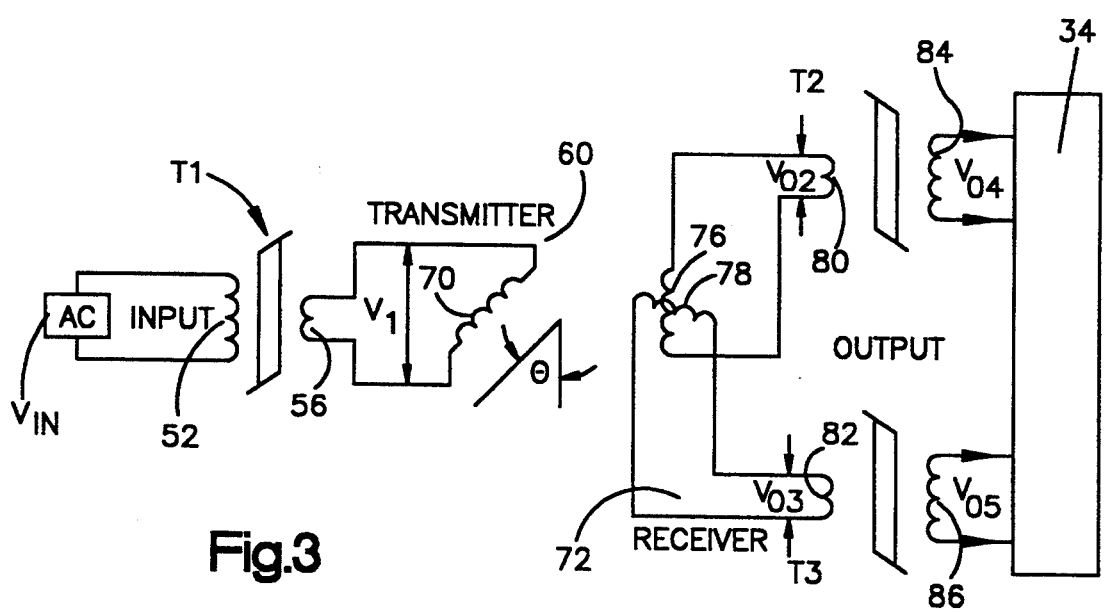
FIG. 3 is a schematic-block diagram illustration of the circuitry employed herein.

Before describing FIG. 2 in further detail, attention is briefly directed to the circuitry of FIG. 3. The circuitry includes a rotary input transformer T1 having a stationary primary winding connected to an AC input voltage $V_{IN}$ and a rotary secondary winding. As will be brought out hereinafter, the rotary secondary winding coaxially surrounds and rotates with the input shaft 16 about the common axis. The secondary winding is electrically connected to a transmitter coil which is axially spaced therefrom and which also rotates with the input shaft 16 about the common axis of rotation. A pair of receiver coils are electrically displaced from each other. These coils are axially spaced from the transmitter coil and coaxially surround and rotate with the output shaft 17. The receiver coils are respectively connected to the primary windings of output rotary transformers T2 and T3. The primary windings of transformers T2 and T3 also coaxially surround and rotate with the output shaft 17. The secondary windings of transformers T2 and T3 are stationary and provide a pair of output signals which are applied to the control circuit 34 for controlling the electric motor 26, all to be described in greater detail hereinafter.

As shown in FIG. 2, the stator 46 carries an annular transformer core 50 which coaxially surrounds and is spaced from the input rotor 42. As viewed in FIG. 2, core 50 is U-shaped in cross section providing an annular channel for receiving and carrying a primary winding 52. The winding 52 is carried by the transformer core so as to coaxially surround the rotor 42.

Spaced radially inwardly across an air gap there is provided an annular transformer core 54 which is carried by the rotor 42. Core 54 has a U-shaped cross-section having a channel provided therein facing radially outward toward transformer core 50. The U-shaped channel in transformer core 54 carries a secondary winding 56 so that the winding coaxially surrounds rotor 42 and is rotatable with the rotor about the common axis. As described, the transformer core 50 and its primary winding 52 form the stationary portion of a transformer T1 and the transformer core 54 with its winding 56 form the rotary portion of the rotary transformer T1. The transformer cores 52 and 54 are preferably constructed of a magnetically permeable material or the like to confine the magnetic circuit to the transformer cores which immediately surround the primary winding 52 and the secondary winding 56.

The transmitter 60 coaxially surrounds and is mounted to a rotor 42 for rotation therewith about the common axis. Immediately to the left, as viewed in FIG. 2, the transmitter 60 is provided with an annular backing plate 62 which is used for confining the sensor flux path to be described in greater detail hereinafter. The backing plate 62 and the transformer cores herein are of magnetically permeable material and may be constructed of powdered iron or ferrite filled plastic or soft ferrite. The transmitter 60 includes a coil set 70, to be described in greater detail hereinafter with reference to FIG. 5. The coil set 70 has plural coils which are connected together in series across the secondary winding 56 of the rotary transformer T1 (the interconnection between winding 56 and coil set 70 is not illustrated in FIG. 2 for clarity).

Axially spaced from transmitter 60 there is provided a receiver 72. This is carried by the rotor 44 and rotates therewith about the common axis. As in the case of transmitter 60, the receiver 72 has associated therewith a backing plate 74 which is also mounted to the rotor 44 and rotates therewith about the common axis. The plate 74, like plate 62, is an annular plate and may be constructed of the same material as that discussed hereinbefore with reference to backing plate 62. The receiver 72 carries two sets of receiver coils 76 and 78. These will be described in greater detail hereinafter with reference to FIGS. 7 and 8. The coil set 76 includes a plurality of coils which are connected together in series. Similarly, coil set 78 includes a plurality of coils which are connected together in series. Coil set 78 is angularly displaced from coil set 76 and electrically insulated therefrom. Coil set 76 is connected across the primary winding 80 of rotary output transformer T2 whereas coil set 78 is connected across primary winding 82 of rotary output transformer T3 (see FIG. 3). The secondary winding 84 of transformer T2 and the secondary winding 86 of transformer T3 are connected to the control circuit 34. Plates 62 and 74 serve to confine the flux paths to the magnetic circuit associated with the coil sets and the air gaps between the coil sets. The backing plates provide a high permeable magnetic return path for the flux from one pole to the next. Except for the air gap, the flux is essentially confined and contained by the backing plates.

As shown in FIG. 2, the transformer T2 has its primary circuit carried by the rotor 44. Thus, a transformer core 90 is carried by output rotor 44 for rotation therewith about the common axis. The transformer core 90 is U-shaped in cross section providing an annular channel which coaxially surrounds the common axis. The channel receives the primary winding 80 of the transformer T2. The secondary side of transformer T2 is carried by the stationary stator 46. This includes an annular transformer core 92 which is radially spaced from and coaxially surrounds the rotor 44. The transformer core 92 is U-shaped in cross section defining a channel which faces toward the rotor and which carries the stationary secondary winding 84 of the transformer T2. Thus, the secondary winding 84 is radially spaced from and coaxially surrounds the primary winding 80 on the transformer core 90.

Transformer T3 has its primary circuit carried by the output rotor 44. This includes a transformer core 96 which takes the form of an annular member coaxially surrounding and suitably mounted to the output rotor 44 for rotation therewith about the common axis. The transformer core 96 is U-shaped in cross section providing an annular channel which receives the primary winding 82 so that this winding coaxially surrounds rotor 44 for rotation therewith about the common axis.

The secondary circuit of the transformer T3 is carried by the stationary stator housing 46. This includes a transformer core 98. This is an annular member which coaxially surrounds and is radially spaced outward from rotor 44 and is secured to the stator housing 46. As shown in FIG. 2, the transformer core 98 is U-shaped in cross section and defines an annular channel facing toward rotor 44. This channel carries the secondary winding 86 so that this winding coaxially surrounds and is radially spaced from the primary winding 82 of this transformer.

An annular shield 100 axially separates the rotary transformer cores 92 and 98 from each other to minimize cross talk between the secondary windings of transformers T2 and T3. Similarly, an annular shield 102 separates the rotary transformer cores 90 and 96 from each other to minimize cross talk between the primary and secondary windings of transformers T2 and T3. The metal shields 100 and 102 may be constructed from cold rolled steel, for example.

A pair of adjacent annular shields 104 separate the rotor transformer core 54 from the backing plate 62 to minimize stray leakage at the transformer from reaching the magnetic circuit of the transmitter 60. Similarly, a pair of annular shields 106 separate the stator transformer core 50 from the stator housing as well as from the magnetic circuit of the transmitter 60. These shields may be constructed from cold rolled steel, for example.

Three embodiments of the angle sensor are disclosed herein. A first embodiment is shown in FIGS. 5-8, a second embodiment is shown in FIGS. 9 and 10, and a third embodiment is shown in FIGS. 11-13. Each embodiment illustrates a rotary transmitter which is adapted to be driven by the input shaft 16 for rotation therewith about the common axis. The rotary transmitter includes a coil set that includes a plurality of series connected coils arranged in an annular array about the common axis on an axially directed face of the transmitter. All of the coils are wound in the same direction and are electrically connected to the secondary winding 56 of the input rotary transformer T1 for purposes of receiving an input signal therefrom. Each embodiment also includes a rotary receiver 2 which is axially spaced from the transmitter and is driven by the output shaft 17 for rotation about the common axis. The receiver includes an axially directed face (see FIG. 2) which extends toward the transmitter face. The receiver carries first and second coil sets. Each coil set includes a plurality of series connected coils mounted on the receiver face. Each of the coils is wound in the same direction. Also, each of the coil sets is arranged in an annular array about the common axis.

First Embodiment

Figure 5:
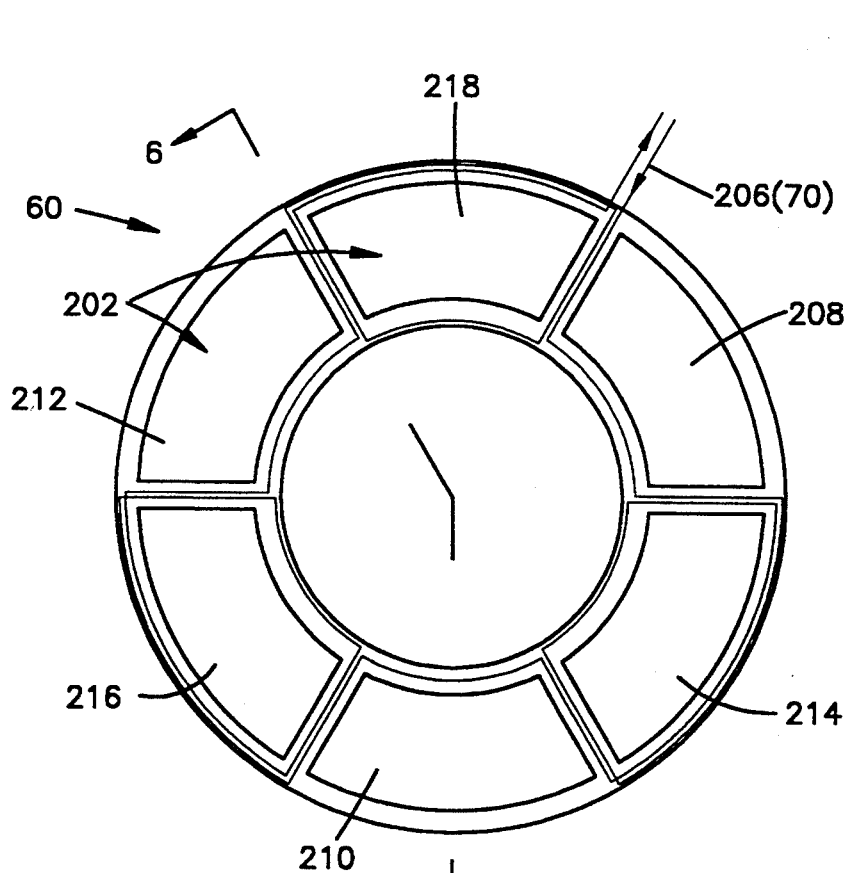
FIG. 5 is view of the front face of a transmitter disk having segmented poles carrying an annular array of coils.
Figure 6:
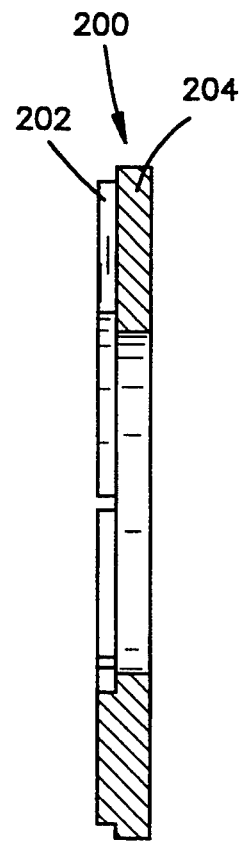
FIG. 6 is a view taken along line 6—6 in FIG. 5 looking in the direction of the arrows.

Attention is now directed to FIGS. 5-8 which illustrate a first embodiment of the angle sensor. This includes an annular ring 200 which is constructed of powdered iron or ferrite filled plastic or soft ferrite. The ring 200 includes a plurality of segmented pole pieces 202 which extend from one face of the ring in an axial direction. In the embodiment illustrated, there are six pole pieces (or poles) separated by radially extending slots with the slots being spaced 60° from each other about a common axis of rotation. The poles of the transmitter extend toward similar poles on the receiver. Each of the poles extends axially from a backing plate 204 which serves as the backing plate 62 discussed with reference to FIG. 2. In this embodiment, an elongated conductor 206 is wound about every other pole of the six pole arrangement. These are referred to herein as active poles with the intermediate poles being referred to as consequent poles. Referring to FIG. 5, the consequent poles are poles 208, 210 and 212 and the active poles are poles 214, 216 and 218. Conductor 206 is wound about each of the active poles 214, 216 and 218 with two turns. The turns are in the same winding direction, clockwise in the example being presented. This provides an annular array of three coils each having two turns with the coils being mounted only on the active poles. The conductor extends underneath the intermediate consequent poles as it traverses from one coil to the next. The single elongated conductor 206 may be assembled so that the coils are prewound, using bondable magnet wire, or are wound in place with an automatic winding machine. In the latter case, it may be desirable to employ a keeper slot in the pole pieces. Whether the coils are prewound or wound in place, the coils can be inserted without having any solder joints between the coils.

The receiver in the first embodiment is illustrated in FIGS. 7 and 8. The receiver is similar to the transmitter but differs therefrom in that it has twice the number of poles and two elongated conductors each having three coils. The receiver includes an annular ring 300 having twelve segmented pole pieces 302 on one axially directed face thereof. The pole pieces 302 are formed by twelve radially extending slots located 30° apart. Each of these pole pieces or poles is provided with a keeper slot 303 to assist in keeping conductors in place. The receiver carries two conductors including an A conductor 306 and a B conductor 307. For each conductor 306 and 307, the pole pieces alternately serve as active poles and consequent poles in the same manner as that discussed hereinbefore with reference to the transmitter.

The segmented poles includes twelve poles 308–330. For each conductor, the poles are grouped in pairs. The pairs alternate between a pair of active poles and a pair of consequent poles. Thus, the A conductor 306 initially extends underneath poles 308 and 310 and then is wound about poles 312 and 314 making two turns in a clockwise direction. The first two poles 308 and 310 serve as a pair of consequent poles for the A conductor 306 and the second pair of poles 312 and 314 serve as the active poles for the A conductor 306. The A conductor 306 continues with this pattern so as to define three coil sets each making two turns in a clockwise direction with the three coils being wound about active pole pairs 312–314, 320–322, and 328–330. The second coil set is defined by the B conductor 307 and this coil set is displaced from that of A conductor 306. The B conductor 307 initially extends beneath the segmented poles 310 and 312 and then it makes two turns around a pole pair including poles 314 and 316. Thus, for conductor 307, poles 310 and 312 serve as consequent poles whereas the poles 314 and 316 serve as active poles. This pattern continues so that the B conductor 307 has three sets of coils with the coils being wound around segmented pole pairs 314–316, 322–324, and 330–308. All of the coils are wound in the same direction, clockwise in the example being illustrated. In assembly, the transmitter and receiver are axially spaced from each other so that the air gap between the opposing faces of the pole pieces may be on the order of 0.5 mm.

Second Embodiment

A second embodiment of the angle sensor is illustrated in FIGS. 9 and 10. This embodiment is quite similar to that illustrated in FIGS. 5 through 8 and like character references are employed in identifying like components. Only the differences will be described in detail herein. The transmitter of the second embodiment is shown in FIG. 9 and, as in the embodiment of FIG. 5, it includes an annular ring 200 having six segmented poles 202 arranged in an array on one face of the annular ring. In FIG. 9, the transmitter employs a conductor 206' which has only a single partial turn around active poles 214, 216 and 218. As is seen from an examination of FIG. 9, conductor 206' has an organized repeated pattern with the conductor making clockwise turns about active poles 214, 216 and 218 and making no turns about the consequent poles 208, 210 and 212. The coils on the active poles 214, 216 and 218 do not have complete turns. The conductor 206' does not make a complete or closed loop upon itself when wrapped around an active pole. Instead, each coil is formed from a loop of conductor 206' which makes essentially a three-quarter turn about the pole segment.

The receiver is shown in FIG. 10 and is similar to that of the receiver shown in FIGS. 7 and 8. The receiver includes annular ring 300 having segmented poles 302 defined on one axially directed face. These are arranged in an annular array including poles 308–330. The A conductor 306' is similar to that of the A conductor 306 in FIG. 7. However, conductor 306' makes only one partial turn in a clockwise direction about the active pole pairs 312–314, 320–322, and 328–330 as opposed to the two turns in the embodiment of FIG. 7. Similarly, the B conductor 307' makes only one partial turn in a clockwise direction about active pole pairs 314–316, 322–324, and 330–308.

Third Embodiment

The transmitter and receiver of the third embodiment are quite similar to each other and will be described with reference to FIGS. 11–13. The transmitter, a 12-pole device, as shown in FIG. 11A, includes an annular disk 400 which is constructed of suitable electrical insulator material. On one face of this disk there is provided a planar coil set wound from a conductor 402. Conductor 402 may take the form of a flat copper trace mounted on a flat face of the disk. The conductor 402 is arranged in an annular array of flat coils including coils 404, 406, 408, 410 and 412. These coils are arranged in an annular array. Also, each coil, as in the case of the embodiments discussed hereinbefore, may be considered as being wound in the same direction, clockwise in the embodiment illustrated in FIG. 11A. No segmented poles are provided in this embodiment. The coils 404–412 are wound in a manner similar to that of the single turn embodiment shown in FIG. 9 which does employ segmented poles. This embodiment, while similar to that of FIG. 9, eliminates the segmented poles. This provide a structure which, in mass production, may be substantially less expensive than that of FIG. 9. The coils form a coil set 70 connected across the secondary winding 56 of the transformer T1 in the manner as shown in FIG. 3. The disk 400 is secured, as with a suitable bonding material, to a flat face of a backing plate which does not have segmented poles. The transmitter is mounted to shaft 16 for rotation about the common axis.

Reference is now made to FIG. 12 which illustrates a disk 500 which is similar to that of disk 400 in FIG. 11A. Disk 500, in a manner similar to that of disk 400, carries on one face thereof a set of coils arranged in an annular array with the coils being connected together in series in a manner essentially identical to that of the coils in FIG. 11A. Conductor 502, in a manner similar to that of conductor 402, takes the form of a flat copper trace mounted on one face of the disk 500 to form a plurality of flat coils 504, 506, 508, 510 and 512. These coils are wound in the same direction, such as clockwise in the embodiment being illustrated. Coils 504–512, as in the case of coils 404–412, are each formed from a loop which does not close upon itself as in the case of the single turn coils shown in the embodiment of FIGS. 9 and 10.

The receiver takes the form an overlay which would correspond with disks 400 and 500 to form the structure illustrated in FIG. 13. In this Figure, the receiver is indicated as including an insulator disk 600 having conductors 502 and 402, as arranged in FIGS. 11A and 12, superimposed on top of each other. Preferably, the conductors are on different layers insulated from each other and are rotated about their axis from each other. The mechanical rotation may be, for example 16.5°, for the arrangement as shown in the embodiment herein.

Referring to FIG. 3, the input $V_1$ and output $V_{02}$, $V_{03}$ voltages are shown. An excitation voltage into the transmitter section is:

$$V_1 = A \sin \omega t \tag{1}$$

Where A is a constant and wherein $\omega t$ is the frequency of excitation, typically 200 kHz. FIG. 3 shows the transmitter coil set 70 at an electromechanical angle $\Theta$ with respect to the receiver coil set 76. $\Theta$ is the axial angle of electromechanical alignment between the two disks, where 360° of $\Theta$ represents 2/P of a revolution of the disks, where P is the number of poles. Thus, one electromechanical "revolution" is equal to 60 mechanical degrees. The output pattern of the voltage signals versus relative disk rotation repeats itself six times per one mechanical revolution. This fact represents an amplified sensitivity of the sensor transfer function of output voltage amplitude versus mechanical rotation.

Since the conductor pattern has relatively narrow conductor paths and relatively larger coil areas, the inductive coupling between transmitter coil set 70, and receiver coil sets 76 and 78 is linearly proportional to the electromechanical angle $\Theta$ over a limited range, as long as the transmitter and receiver conductors do not overlap each other.

The conductor pattern of coil sets 76 and 78 is oriented 81 electrical degrees from each other, as shown in FIG. 3.

Figure 4:
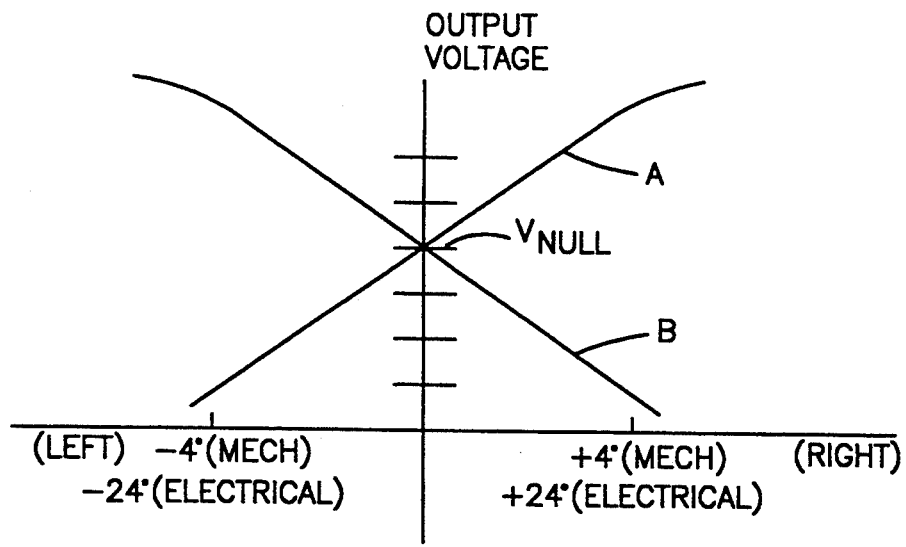
FIG. 4 is a graphical representation of the output signals from the torque sensor versus the degree of relative rotation between the input shaft and the output shaft.

The sensor is designed to operate over an angle of plus and minus 4 mechanical degrees (see FIG. 4). Since the sensor has 12 poles, this means that the operational range at the electromechanical level is P/2 times (6 times) larger. Thus, the operational range is plus and minus 24 electromechanical degrees.

The electrical equation for the receiver output is:

for coil set 76:

$$V_{02} = B(\sin \omega t)\Theta \text{ for } 17.5° < \theta < 65.5° \tag{2}$$

for coil set 78:

$$V_{03} = B(\sin \omega t)(81 - \theta) \text{ for } 17.5° < \theta < 65.5° \tag{3}$$

B is a constant.

The operational "null" position of the device is at $\Theta = 40.5°$, where both $V_{02}$ and $V_{03}$ amplitudes are equal. However, the amplitudes will vary in opposite directions with a change in $\Theta$ from the 40.5° position.

Referring now to FIG. 4, there is shown a graphical illustration of voltage with respect to degrees of relative rotation and showing curves A and B. Curve A may be considered as a curve connecting plotted points representing peak-to-peak values of the output voltage $V_{04}$ as steering wheel torque is applied. Curve B represents similar peak-to-peak voltage values of the output voltage $V_{05}$. The two curves A and B intersect at a voltage level $V_{null}$ where the output voltages $V_{04}$ and $V_{05}$ are equal. In the example presented, the maximum value of $V_{04}$ or $V_{05}$ is on the order of 1.4 volts and the value of $V_{null}$ may be on the order of 0.92 volts peak-to-peak. The curves of FIG. 4 show that the relationship between the output voltages is such that as the amplitude of one signal increases, the other decreases in a like amount. Thus, the two signals are ratiometric, rather than absolute and disturbances which affect one signal would affect each in the same manner, so that the ratio between the two signals will always be the same for a given torque output. The system is therefore relatively immune from disturbances such as from axial movement between the two discs.

Summary

In summation, a torque sensor is provided for use in a power assist steering system for sensing the applied torque between an input shaft and an output shaft. This is accomplished by measuring the relative angular rotation of the shafts about their common axis. In the embodiments disclosed, the torque sensor employs a rotary input transformer T1 having a stationary primary winding 52 and a rotary secondary winding 56. A rotary transmitter 60 is driven by the input shaft 16. A coil set 70 is carried by the input shaft and includes a plurality of series connected coils arranged in an annular array about the axis on an axially directed face of the transmitter. All of the coils are wound in the same direction and are electrically connected to the secondary winding 56 for receiving an input signal therefrom. A rotary receiver is axially spaced from the transmitter and is driven by the output shaft 17. The receiver has an axially directed face extending toward that of the transmitter face and includes first and second coil sets 76 and 78. Each of these coil sets includes a plurality of series connected coils mounted on the receiver face. The coils are wound in the same direction and arranged in an annular array. A pair of output transformers T2 and T3 are provided. These transformers respectively have primary windings 80 and 82 which rotate with the output shaft and stationary secondary windings 84 and 86.

Although the invention has been described in conjunction with preferred embodiments, it is to be appreciated that various modifications may be made without departing from the spirit and scope of the invention as defined by the appended claims.

Having described the invention, the following is claimed:

1. A torque sensor for use in a power assist steering system for sensing the applied torque between an input shaft and an output shaft wherein said shafts are coaxially aligned with each other and rotatable relative to each other about a common axis of rotation, said sensor including:

a rotary input transformer having a stationary primary winding and a rotary secondary winding;

a rotary transmitter adapted to be driven by the input shaft for rotation therewith about said axis, a coil set including a plurality of series connected coils arranged in an annular array about said axis on an axially directed face of said transmitter with all of said coils being wound in the same direction and electrically connected to said secondary winding for receiving an input signal therefrom;

a rotary receiver axially spaced from said transmitter and adapted to be driven by said output shaft for rotation therewith about said axis, said receiver having an axially directed face extending toward said transmitter face, first and second coil sets each including a plurality of series connected coils mounted on said receiver face, each of said coils being wound in the same direction, each of said coil sets being arranged in an annular array about said axis;

first and second rotary output transformers having first and second primary windings respectively electrically connected to said first and second receiver coil sets and adapted to be driven by said output shaft for rotation therewith about said axis, said first and second output transformers respectively including first and second stationary secondary windings;.

wherein each said coil is wound so as to make an incomplete turn about itself.

2. A torque sensor as set forth in claim 1 wherein said receiver includes a plurality of segmented poles arranged in an annular array about said axis and facing said transmitter poles.

3. A torque sensor as set forth in claim 2 wherein each of said first and second receiver coil sets includes an elongated conductor wound so as to make N coils with each coil being wound on two associated said receiver poles.

4. A torque sensor as set forth in claim 3 wherein said receiver has 4N poles, said transmitter has 2N poles, and each of said first and second receiver coil sets includes N coils.

5. A torque sensor as set forth in claim 4 wherein said first and second coil sets are angularly displaced from each other about said axis.

6. A torque sensor as set forth in claim 5 wherein each said coil makes an incomplete turn about its associated pair of said receiver poles.

7. A torque sensor for use in a power assist steering system for sensing the applied torque between an input shaft and an output shaft wherein said shafts are coaxially aligned with each other and rotatable relative to each other about a common axis of rotation, said sensor including:

a rotary input transformer having a stationary primary winding and a rotary secondary winding;

a rotary transmitter adapted to be driven by the input shaft for rotation therewith about said axis, a coil set including a plurality of series connected coils arranged in an annular array about said axis on an axially directed face of said transmitter with all of said coils being wound in the same direction and electrically connected to said secondary winding for receiving an input signal therefrom;

a rotary receiver axially spaced from said transmitter and adapted to be driven by said output shaft for rotation therewith about said axis, said receiver having an axially directed face extending toward said transmitter face, first and second coil sets each including a plurality of series connected coils mounted on said receiver face, each of said coils being wound in the same direction, each of said coil sets being arranged in an annular array about said axis;

first and second rotary output transformers having first and second primary windings respectively electrically connected to said first and second receiver coil sets and adapted to be driven by said output shaft for rotation therewith about said axis, said first and second output transformers respectively including first and second stationary secondary windings;

said transmitter is provided with a plurality of segmented poles arranged in an annular array about said axis and wherein each of said coils is associated with one of said poles, said transmitter has 2N poles and N coils associated with only N of said transmitter poles, said 2N poles include N active poles and N inactive poles with each active pole being separated from the next active pole by an inactive pole; and wherein said N coils are respectively on said N active poles.

8. A sensor as set forth in claim 7 wherein each said coil is constructed from a single conductor which makes an incomplete turn about each associated active pole.

9. A torque sensor for use in a power assist steering system for sensing the applied torque between an input shaft and an output shaft wherein said shafts are coaxially aligned with each other and rotatable relative to each other about a common axis of rotation, said sensor including:

a rotary input transformer having a stationary primary winding and a rotary secondary winding;

a rotary transmitter adapted to be driven by the input shaft for rotation therewith about said axis, a coil set including a plurality of series connected coils arranged in an annular array about said axis on an axially directed face of said transmitter with all of said coils being wound in the same direction and electrically connected to said secondary winding for receiving an input signal therefrom;

a rotary receiver axially spaced from said transmitter and adapted to be driven by said output shaft for rotation therewith about said axis, said receiver having an axially directed face extending toward said transmitter face, first and second coil sets each including a plurality of series connected coils mounted on said receiver face, each of said coils being wound in the same direction, each of said coil sets being arranged in an annular array about said axis;

first and second rotary output transformers having first and second primary windings respectively electrically connected to said first and second receiver coil sets and adapted to be driven by said output shaft for rotation therewith about said axis, said first and second output transformers respectively including first and second stationary secondary windings;

wherein said transmitter includes an elongated conductor which includes said series connected coils arranged in an annular array with said coil set including N coils each making an incomplete turn about itself.

* * * * *